US006948079B2

(12) United States Patent
Zhang et al.

(10) Patent No.: US 6,948,079 B2
(45) Date of Patent: Sep. 20, 2005

(54) METHOD AND APPARATUS FOR PROVIDING SUPPLY VOLTAGES FOR A PROCESSOR

(75) Inventors: Kevin X. Zhang, Portland, OR (US); Don J. Nguyen, Portland, OR (US); Daniel J. Lenehan, Los Altos Hills, CA (US)

(73) Assignee: Intel Corporation, Santa Clara, CA (US)

( * ) Notice: Subject to any disclaimer, the term of this patent is extended or adjusted under 35 U.S.C. 154(b) by 548 days.

(21) Appl. No.: 10/033,406

(22) Filed: Dec. 26, 2001

(65) Prior Publication Data

US 2003/0120958 A1 Jun. 26, 2003

(51) Int. Cl.⁷ .................................................. G06F 1/26
(52) U.S. Cl. ...................... 713/300; 713/320; 713/322; 713/323; 713/324; 713/330
(58) Field of Search ................................. 713/300, 320, 713/322, 323, 324, 330, 310

(56) References Cited

U.S. PATENT DOCUMENTS

| | | | |
|---|---|---|---|
| 4,677,566 A | | 6/1987 | Whittaker et al. |
| 4,792,899 A | * | 12/1988 | Miller .......................... 323/317 |
| 4,839,573 A | * | 6/1989 | Wise ............................ 318/615 |
| 4,990,847 A | | 2/1991 | Ishimaru et al. |
| 5,019,996 A | | 5/1991 | Lee |
| 5,056,398 A | * | 10/1991 | Adamson ...................... 84/454 |
| 5,440,520 A | | 8/1995 | Schutz et al. |
| 5,448,716 A | | 9/1995 | Hardell, Jr. et al. |
| 5,475,374 A | * | 12/1995 | Moore .................... 340/825.22 |
| 5,621,347 A | * | 4/1997 | Saito et al. .................. 327/540 |
| 5,689,179 A | * | 11/1997 | Walker ......................... 323/283 |
| 5,778,237 A | | 7/1998 | Yamamoto et al. |
| 5,787,014 A | * | 7/1998 | Hall et al. .................... 323/312 |
| 5,910,930 A | | 6/1999 | Dieffenderfer et al. |
| 5,932,987 A | * | 8/1999 | McLoughlin ................ 318/696 |
| 5,945,817 A | | 8/1999 | Nguyen |
| 5,996,083 A | * | 11/1999 | Gupta et al. ................. 713/322 |
| 6,002,630 A | | 12/1999 | Chuang et al. |
| 6,198,261 B1 | * | 3/2001 | Schultz et al. ............... 323/272 |
| 6,246,282 B1 | | 6/2001 | Oono et al. |
| 6,288,523 B2 | * | 9/2001 | Antoszkiewicz ............. 323/267 |
| 6,351,108 B1 | * | 2/2002 | Burstein et al. ............. 323/283 |
| 6,362,609 B1 | * | 3/2002 | Gailhard ...................... 323/280 |
| 6,366,794 B1 | * | 4/2002 | Moussy et al. .............. 600/345 |
| 6,425,086 B1 | * | 7/2002 | Clark et al. .................. 713/322 |
| 6,438,462 B1 | * | 8/2002 | Hanf et al. ................... 700/297 |
| 6,446,212 B1 | * | 9/2002 | Smit et al. ................... 713/300 |
| 6,519,704 B1 | | 2/2003 | Liddell et al. |
| 6,519,707 B2 | * | 2/2003 | Clark et al. .................. 713/322 |
| 6,650,589 B2 | * | 11/2003 | Clark .......................... 365/226 |
| 6,785,829 B1 | * | 8/2004 | George et al. ............... 713/320 |
| 2003/0122429 A1 | | 7/2003 | Zhang et al. |
| 2003/0126477 A1 | | 7/2003 | Zhang et al. |

FOREIGN PATENT DOCUMENTS

| | | |
|---|---|---|
| EP | 0 632 360 A1 | 1/1995 |
| EP | 0 849 660 A1 | 6/1998 |
| EP | 0 872 790 A2 | 10/1998 |
| EP | 0 978 781 A3 | 4/2003 |
| WO | WO 01/71884 A2 | 9/2001 |
| WO | PCT/US02/37981 | 12/2003 |

OTHER PUBLICATIONS

Frederiksen, T., "Intuitive Operation Amplifiers", 1988, McGraw Hill Book Company, pp. 65–68, XP–002262250.

* cited by examiner

*Primary Examiner*—Lynne H. Browne
*Assistant Examiner*—Nitin C. Patel
(74) *Attorney, Agent, or Firm*—Rob D. Anderson

(57) ABSTRACT

For one embodiment of the present invention, a processor may include one or more integrated voltage regulators powered by an external voltage regulator and generating one or more local supply voltages for the processor. The one or more local supply voltages may be set to allow one or more circuits powered by the local supply voltage(s) to meet a timing requirement. The local supply voltage(s) may be adjusted by the processor in accordance with a power management policy.

14 Claims, 4 Drawing Sheets

METHOD AND APPARATUS FOR PROVIDING SUPPLY VOLTAGES FOR A PROCESSOR

The present invention relates to computer systems and more particularly to controlling one or more supply voltages to power one or more circuits of an integrated circuit, such as a processor

BACKGROUND

Computer systems are becoming increasingly pervasive in our society, including everything from small handheld electronic devices, such as personal data assistants and cellular phones, to application-specific electronic components, such as set-top boxes and other consumer electronics, to medium-sized mobile and desktop systems to large workstations and servers. Computer systems typically include one or more processors. A processor manipulates and controls the flow of data in a computer. To provide more powerful computer systems for consumers, processor designers strive to continually increase the operating speed of the processor. Unfortunately, as processor speed increases, the power consumed by the processor tends to increase as well. Historically, the power consumed by a computer system has been limited by two factors. First, as power consumption increases, the computer tends to run hotter, leading to thermal dissipation problems. Second, the power consumed by a computer system may tax the limits of the power supply used to keep the system operational, reducing battery life in mobile systems and diminishing reliability while increasing cost in larger systems.

The present invention addresses this and other problems associated with the prior art.

BRIEF DESCRIPTION OF THE DRAWINGS

The present invention is illustrated by way of example and not limitation in the accompanying figures in which like references indicate similar elements and in which.

DETAILED DESCRIPTION

In accordance with an embodiment of the present invention, a processor may include analog circuitry including one or more op amps. For one embodiment of the present invention, the op amp may be in a differential configuration including an input coupled to a supply voltage, Vcc, provided by an external voltage regulator. In this manner, the op amp may be part of a voltage sensor, the output of the op amp being a control signal to indicate if the supply voltage is above or below a target value. This target value may be adjusted by the processor in accordance with a power management policy. The control signal may be provided to the external voltage regulator to adjust the supply voltage accordingly.

For this or another embodiment of the present invention, an op amp may form a portion of an integrated voltage regulator, the op amp being powered by an external voltage regulator and generating a local supply voltage for the processor. This local supply voltage may be set to allow a circuit powered by the local supply voltage to meet a timing requirement. The local supply voltage may be adjusted by the processor in accordance with a power management policy. In accordance with one embodiment of the present invention, the processor may include multiple integrated voltage regulators generating multiple local supply voltages. Each local supply voltage may be independently adjusted to allow corresponding circuits to meet timing requirements and for power management.

A more detailed description of embodiments of the present invention, including various configurations and implementations, is provided below.

Figure 1:
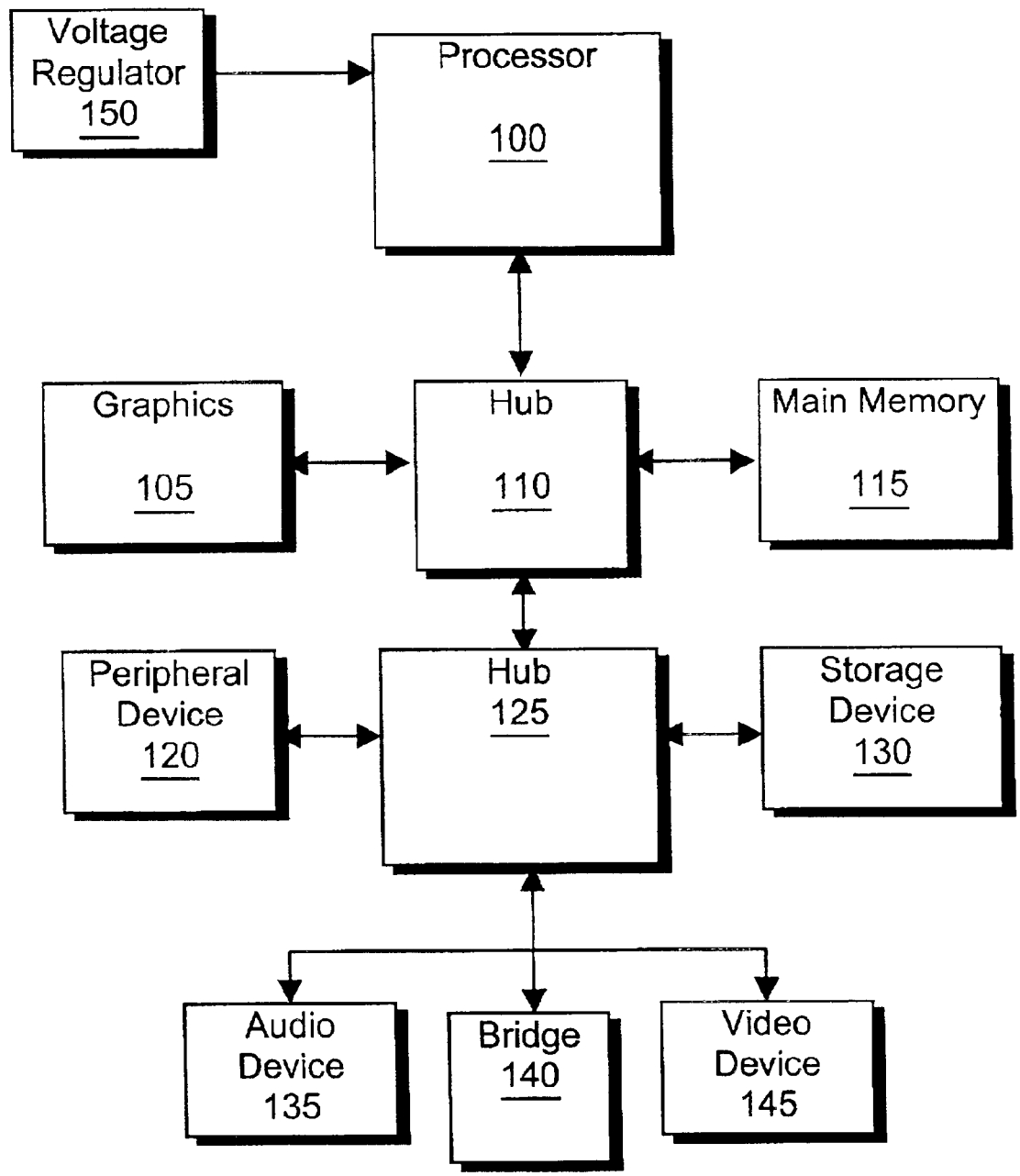
FIG. 1 includes a computer system formed in accordance with an embodiment of the present invention.

FIG. 1 includes a computer system that may be formed in accordance with an embodiment of the present invention. As shown, the computer system may include a processor 100 coupled to hub 110. Processor 100 may be powered by one or more voltages from voltage regulator 150. Processor 100 may communicate with graphics controller 105, main memory 115, and hub 125 via hub 110. Hub 125 may couple peripheral device 120, storage device 130, audio device 135, video device 145, and bridge 140 to hub 110. Bridge 140 may couple hub 125 to one or more additional buses coupled to one or more additional peripheral devices. Note that in accordance with alternate embodiments of the present invention, a computer system may include more or fewer components than those shown in FIG. 1. Note, also, that the components of FIG. 1 may be partitioned differently. For example, multiple components may be integrated into a single component, and single components may be divided into multiple components.

For one embodiment of the present invention, voltage regulator 150 is a discrete voltage regulator that is external to processor 100 of FIG. 1. Voltage regulator 150 may provide one or more supply voltages to processor 100 alone or in addition to providing one or more supply voltages to other components of the computer system. In addition, there may be one or more additional voltage regulators that provide one or more additional supply voltages to processor 100. Note that the term "Vcc" may be used herein to denote a supply voltage.

Although embodiments of the present invention may be described herein in association with a processor, it is to be noted that embodiments of the present invention may be implemented in other components as well. Therefore, for convenience, the term "processor" may be used herein to refer not only to a processor (e.g. a central or multi-processing unit, digital signal processor, micro-controller, etc.) but also to other components such as a hub (e.g. a bridge, chipset, etc.) or a controller (e.g. a graphics controller, memory controller, etc).

Figure 2A:
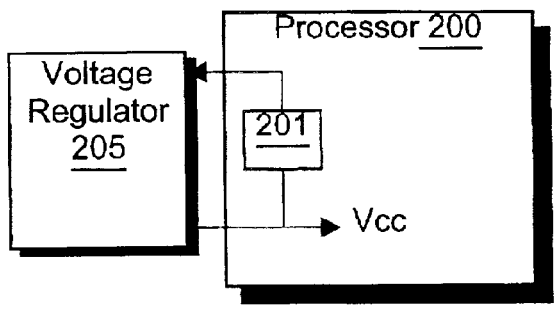
FIG. 2A includes a processor formed in accordance with an embodiment of the present invention.

In accordance with one embodiment of the present invention, processor 100 and voltage regulator 150 of FIG. 1 may be implemented as processor 200 and voltage regulator 205 of FIG. 2A. Voltage regulator 205 provides a supply voltage, Vcc, to processor 200 via one or more voltage/power supply lines that couple voltage regulator 205 to one or more supply voltage input ports of processor 200. This Vcc may be distributed to various circuits of processor 200 to power the circuits. In addition, processor 200 includes a voltage sensor 201 coupled to one or more supply voltage input ports of processor 200 to receive Vcc. Voltage sensor 201 monitors Vcc received from the voltage regulator and, in response, provides a control signal to indicate if the supply voltage is above or below a target value. The control signal may be provided back to voltage regulator 205 via one or more control signal lines that couple one or more control signal ports of processor 200 to voltage regulator 205.

Based on the control signal from voltage sensor 201 of FIG. 2A, voltage regulator 205 may adjust Vcc higher or lower to achieve the target value as measured by the voltage sensor. During normal operation (e.g. when the processor is in a wake/active state, executing instructions), Vcc may be set to a target value that allows the processor, or a portion thereof, to meet a timing requirement at a given frequency. This target value may be adjusted by the processor in accordance with a power management policy. For example, when the processor is in a sleep/inactive state, the target value may be reduced by the processor. As another example, the target value may be adjusted in response to a change in the operating frequency of the processor.

By including voltage sensor 201 as part of the same integrated circuit as processor 200, the accuracy of Vcc monitoring may be improved in comparison to integrating the voltage sensor with voltage regulator 205 of FIG. 2A. One reason for this improved accuracy is that monitoring the supply voltage at the processor rather than at the voltage regulator may reduce Vcc variation due to, for example, variation in voltage/power supply line routings between the voltage regulator and the processor. Increased accuracy of Vcc monitoring may improve the ability to implement tighter Vcc design margins. Tighter Vcc design margins may lead to a reduction in Vcc, resulting in a reduction of the overall power consumed by the processor.

Voltage sensor 201 of FIG. 2A may be designed using one or more op amps, comparators, or switching regulators that may include analog circuits integrated with the digital circuitry of processor 200 together on the same semiconductor substrate (i.e. as a single integrated circuit). An op amp of voltage sensor 201 may be designed in a differential or comparator configuration, such as the circuit of FIG. 3A, to be described in more detail below. In accordance with one embodiment of the present invention, multiple voltage sensors may be integrated on the same semiconductor substrate as the processor.

Figure 2B:
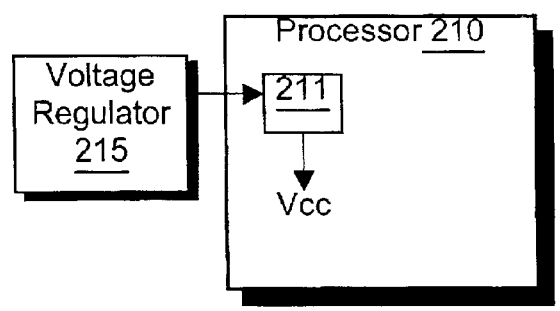
FIG. 2B includes a processor formed in accordance with another embodiment of the present invention.

In accordance with one embodiment of the present invention, processor 100 and voltage regulator 150 of FIG. 1 may be implemented as processor 210 and voltage regulator 215 of FIG. 2B. Voltage regulator 215 provides a supply voltage, Vcc(global), to processor 210 via one or more voltage/power supply lines that couple voltage regulator 215 to one or more supply voltage input ports of processor 210. Processor 210 includes a local voltage regulator 211 coupled to one or more supply voltage input ports of processor 210 to receive Vcc(global). Voltage regulator 211 may be powered by Vcc(global) and provides a local supply voltage Vcc(local) for the processor. This Vcc(local) may be distributed to various circuits of processor 210 to power the circuits. In addition, Vcc(global) may also be distributed to various circuits of processor 210 to power the circuits. For example, Vcc(local) may be used to power all or a portion of a core of processor 210, and Vcc(global) may be used to power all or a portion of an input/output ring of processor 210. In accordance with one embodiment of the present Invention, Vcc(local) may be less than Vcc(global).

The local supply voltage, Vcc(local), provided by voltage regulator 211 of FIG. 2B may be adjusted by processor 210 in control of voltage regulator 211. During normal operation (e.g. when the processor is in a wake/active state, executing instructions), Vcc(local) may be set to a value that allows the processor, or a portion thereof, to meet a timing requirement at a given frequency. This value may be adjusted by the processor in accordance with a power management policy. For example, when the processor is in a sleep/inactive state, Vcc(local) may be reduced by the processor. As another example, the Vcc(local) may be adjusted in response to a change in the operating frequency of the processor.

By including voltage regulator 211 as part of the same integrated circuit as processor 210, two or more different supply voltages can be routed to the various circuits of the processor. By providing processor 210 with different supply voltages at different voltage levels, each supply voltage can be individually tuned to the circuitry that it powers, resulting in a reduction of the overall power consumed by the processor.

Voltage regulator 211 of FIG. 2B may be designed using one or more op amps, comparators, or switching regulators that may include analog circuits integrated with the digital circuitry of processor 210 together on the same semiconductor substrate. An op amp of voltage regulator 211 may be designed as described below in conjunction with FIG. 3B. In accordance with one embodiment of the present invention, multiple voltage regulators may be integrated on the same semiconductor substrate as the processor. For another embodiment of the present invention, one or more voltage regulators may be integrated with one or more voltage sensors on the same semiconductor substrate as the processor.

Figure 2C:
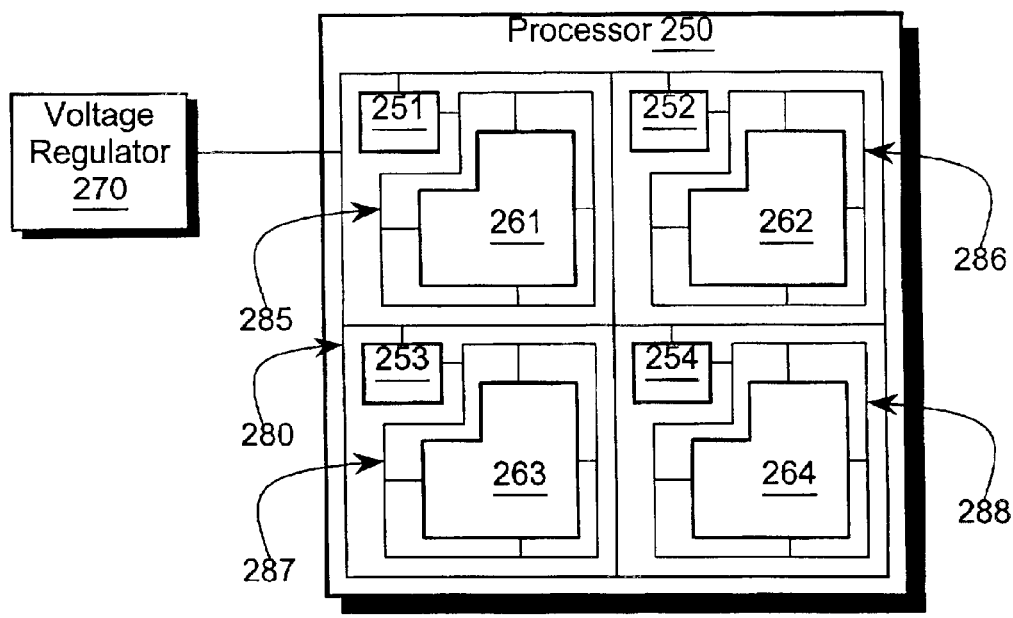
FIG. 2C includes a processor formed in accordance with an alternate embodiment of the present invention.

In accordance with one embodiment of the present invention, processor 100 and voltage regulator 150 of FIG. 1 may be implemented as processor 250 and voltage regulator 270 of FIG. 2C. Voltage regulator 270 provides a supply voltage, Vcc(global), to processor 250 via one or more voltage/power supply lines that couple voltage regulator 270 to one or more supply voltage input ports of processor 250. Processor 250 includes a global power grid 280 coupled to one or more supply voltage input ports of processor 250 to receive Vcc(global). Global power grid 280 may distribute Vcc(global) throughout the processor and, in particular, to multiple local voltage regulators 251–254.

Each local voltage regulator 251–254 of FIG. 2C may be powered by Vcc(global) via global power grid 280, and each provides a local supply voltage, Vcc(local), for the processor. Each Vcc(local) may be distributed via a local power grid to a circuit of processor 250 to power the circuit. For example, local voltage regulator 251 is powered by Vcc (global) via global power grid 280 and provides Vcc(local) to power circuit 261 via local power grid 285. Similarly, local voltage regulators 252–254 are powered by Vcc (global) via global power grid 280 and provide independent local supply voltages to power circuits 262–264, respectively, via local power grids 286–288, respectively.

Each local supply voltage provided by each local voltage regulator 251–254 of FIG. 2C may be independently adjusted by processor 250. During normal operation (e.g. when the associated circuit is active), each Vcc(local) may be set to a value that allows the associated circuit, or a portion thereof, to meet a timing requirement at a given frequency. These values may be adjusted by the processor in accordance with a power management policy. For example, when a circuit powered by a local voltage regulator is inactive, the local supply voltage provided by the local voltage regulator may be reduced by the processor. The local supply voltage may additionally be adjusted in response to a change in the operating frequency of the processor.

As one example, a circuit, such as circuit 261 of FIG. 2C, powered by a local supply voltage provided by a local voltage regulator, such as local voltage regulator 251, may be a branch prediction unit of the processor. When the branch prediction unit is active (e.g. when the unit is processing a branch instruction) the local supply voltage that powers the branch prediction unit may be set to a value that allows the unit to meet a minimum timing requirement at the frequency of operation. When the branch prediction unit is inactive (e.g. between branch instructions), the local supply voltage may be reduced. Similarly, a separate circuit, such as circuit 262, powered by a local supply voltage provided by a local voltage regulator, such as local voltage regulator 252, may be a floating point unit of the processor. When the floating point unit is active (e.g. when the unit is processing a floating point instruction) the local supply voltage that powers the floating point unit may be set to a value that allows the unit to meet a minimum timing requirement at the frequency of operation. When the floating point unit is inactive (e.g. between floating point instructions), the local supply voltage may be reduced.

In this manner, local voltage regulators may provide local supply voltages at different voltage levels to different circuits of the processor. Each local supply voltage can be individually tuned to the circuitry that it powers. For example, the local supply voltage that powers a critical, high performance circuit may be set to a higher voltage than the local supply voltage that powers a less critical, lower performance circuit. This may enable both circuits to meet their timing requirements at the lowest (or nearly the lowest) local supply voltage appropriate for the each circuit individually. This may result in a reduction of the overall power consumed by the processor.

For an alternate embodiment of the present invention, circuits 261–264 may be any other functional unit or other circuit of processor 250 of FIG. 2C. For one embodiment, one or more circuits of circuits 261–264 may be all or a portion of one or more processor cores or memory regions such as a cache. In addition, in accordance with an embodiment of the present invention, a processor may include any number of local voltage regulators, each providing a Vcc (local) to power any number of circuits of the processor.

Voltage regulators 251–254 of FIG. 2C may be designed using one or more op amps, comparators, or switching regulators that may include analog circuits integrated with the digital circuitry of processor 250 together on the same semiconductor substrate. An op amp of voltage regulators 251–254 may be designed as described below in conjunction with FIG. 3B.

Figure 3A:
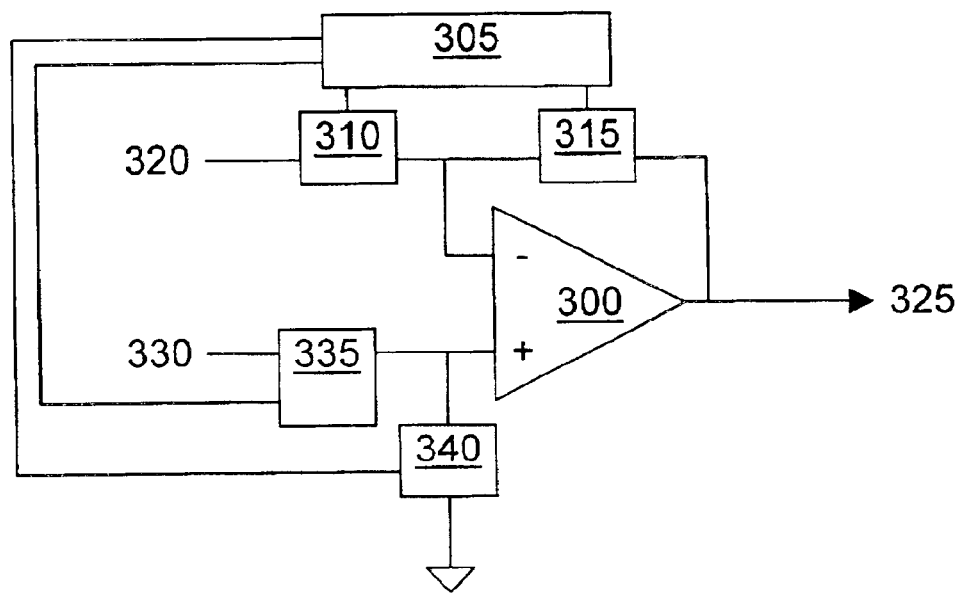
FIG. 3A includes a circuit formed in accordance with an embodiment of the present invention.

FIG. 3A includes an op amp in a differential configuration formed in accordance with an embodiment of the present invention. Output 325 of op amp 300 is fed back to the inverting input of the op amp via resistor 315, and the input voltage 320 is provided to the inverting input of the op amp via resistor 310. The input voltage 330 is provided to the non-inverting input of op amp 300 via resistor 335, and the non-inverting input of the op amp is coupled to ground (or Vss) via resistor 340. Resistors 310, 315, 335, and 340 are digitized resistors, the resistances of which may be set by values entered into control register 305 (which may be implemented as a single or multiple registers). The processor with which the circuit of FIG. 3A may be integrated may set the values in control register 305 to control the output at 325.

In accordance with an embodiment of the present invention in which the circuit of FIG. 3A is used as a voltage sensor, a stable reference voltage, Vref, may be provided as input voltage 320. Vcc (or the voltage to be sensed) may be provided as input voltage 330, and the control signal may be provided at output 325. The resistance of resistor 315 may be kept equal to the resistance of resistor 340, and the resistance of resistor 310 may be kept equal to the resistance of resistor 335. Under these circumstances, the control signal provided at output 325 may be determined by the equation 315/310×(Vcc−Vref) where 315 and 310 are the resistances of resistors 315 and 310, respectively.

Figure 3B:
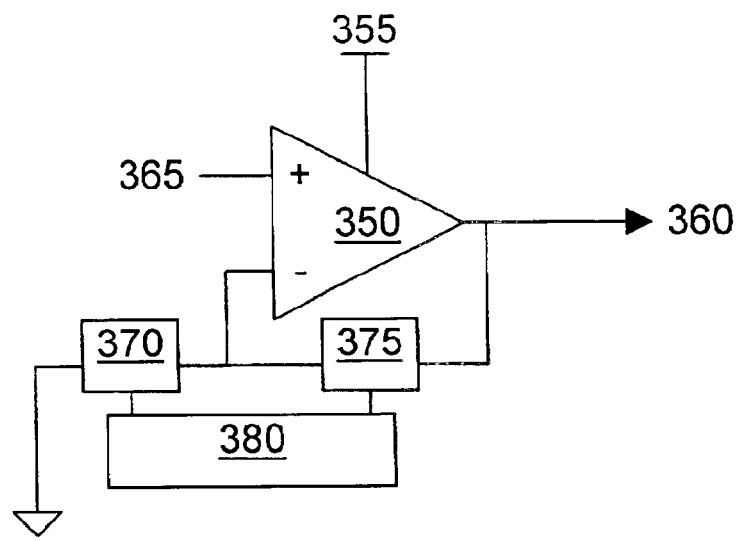
FIG. 3B includes a circuit formed in accordance with another embodiment of the present invention.

FIG. 3B includes a circuit formed in accordance with an embodiment of the present invention. Output 360 of op amp 350 is fed back to the inverting input of the op amp via resistor 375, and the inverting input of the op amp is coupled to ground (or Vss) via resistor 370. Input voltage 365 is provided to the non-inverting input of op amp 350. Supply voltage 355 is provided to power the circuit. Resistors 370 and 375 are digitized resistors, the resistances of which may be set by values entered into control register 380 (which may be implemented as a single or multiple registers). The processor with which the circuit of FIG. 3B may be integrated may set the values in control register 380 to control the output at 360.

In accordance with an embodiment of the present invention in which the circuit of FIG. 3B is used as a local voltage regulator, a stable reference voltage, Vref, may be provided as input voltage 365. Vcc(global) may be provided as supply voltage 355, and Vcc(local) may be provided at output 360. Vcc(local) at output 360 may be determined by the equation Vref×(1+375/370), where 375 and 370 are the resistances of resistors 375 and 370, respectively.

In accordance with one embodiment of the present invention, one or more voltage regulators of a processor may include one or more op amps, e.g. as described above, to provide one or more local supply voltages. One or more voltage regulators of a processor may alternatively include one or more comparators, or switching regulators, separately or in addition to one or more op amps. For one embodiment of the present invention, Vcc(local) may be lower than Vcc(global). For another embodiment, Vcc(local) may be greater than Vcc(global). For one embodiment of the present invention, a switch may be used as a pass element to source current for the voltage regulator to, for example, help reduce the size of the regulator.

Figure 4:
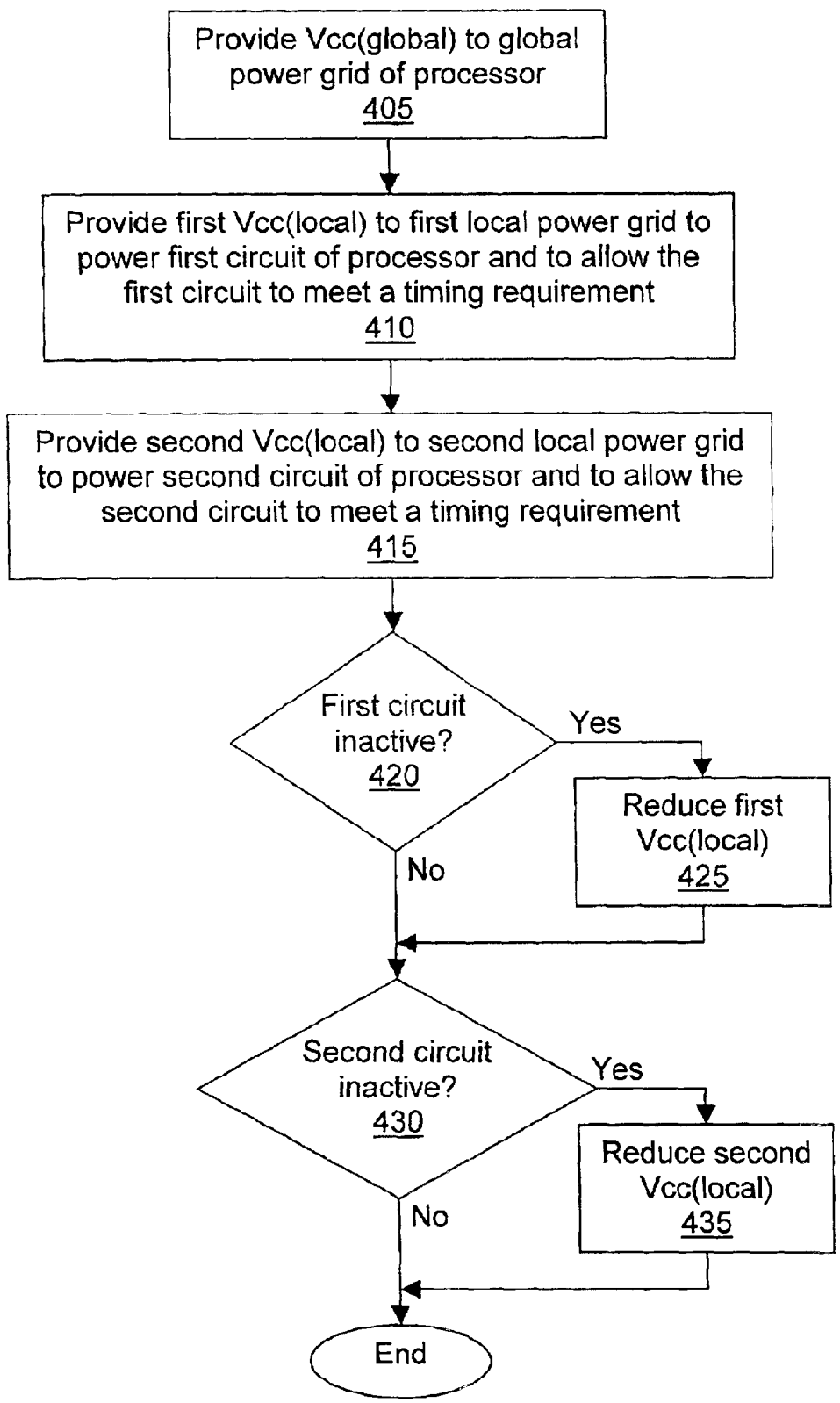
FIG. 4 includes a flow chart showing a method of the present invention.

FIG. 4 includes a flow chart showing a method of the present invention. As shown at step 405, a global supply voltage, Vcc(global), may be provided to a global power grid of a processor from an external, discrete voltage regulator. At step 410, a first local supply voltage, Vcc(local), is provided to a first local power grid to power a first circuit of the processor. This first Vcc(local) is set high enough to allow the first circuit to meet a timing requirement. At step 415, a second local supply voltage, Vcc(local), is provided to a second local power grid to power a second circuit of the processor. This second Vcc(local) is set high enough to allow the second circuit to meet a timing requirement. Note that the first and second local supply voltages may be set to different values and may be adjusted independently of each other.

At step 420 of FIG. 4 it is determined if the first circuit is inactive. If the first circuit is inactive, then the local supply voltage to the first circuit is reduced at step 425. Next, at step 430 it is determined if the second circuit is inactive. If the second circuit is inactive, then the local supply voltage to the second circuit is reduced at step 435.

This invention has been described with reference to specific exemplary embodiments thereof. It will, however, be evident to persons having the benefit of this disclosure that various modifications and changes may be made to these embodiments without departing from the broader spirit and scope of the invention. The specification and drawings are, accordingly, to be regarded in an illustrative rather than a restrictive sense.

What is claimed is:

1. A processor comprising:
   a first functional unit to execute a first stream of instructions;
   a second functional unit to execute a second stream of instructions;
   a first local voltage, regulator to provide a first local supply voltage to the first functional unit, said first local voltage regulator to reduce the first local supply voltage based at least in part on a gap between instructions in the first stream of instructions;
   a second local voltage regulator to provide a second local supply voltage to the second functional unit, said second local voltage regulator to reduce the second local supply voltage based at least in part on a gap between instructions in the second stream of instructions; and
   a global power grid to power the first and second local voltage regulators with a global supply voltage.

2. The processor of claim 1, wherein at least one of the first and second local supply voltages is adjustable by the processor.

3. The processor of claim 2, wherein at least one of the first and second voltage regulators includes a digitized resistor to be set by the processor.

4. The processor of claim 1, wherein at least one of the first and second local supply voltages is to be set to allow the respective functional unit to meet a timing requirement.

5. The processor of claim 1, further comprising a port to receive the global supply voltage from an external voltage regulator.

6. The processor of claim 1, wherein at least one of the first and second local voltage regulators includes an op amp.

7. The processor of claim 1, wherein the first functional unit is selected from a group comprising a branch prediction unit, a floating point unit, and an integer unit.

8. A computer system comprising:
   a discrete voltage regulator to provide a global supply voltage; and
   a processor including
      a first functional unit to execute a first stream of instructions;
      a second functional unit to execute a second stream of instructions;
      a first local voltage regulator to provide a first local supply voltage to the first functional unit, said first local voltage regulator to reduce the first local supply voltage based at least in part on a gap between instructions in the first stream of instructions;
      a second local voltage regulator to independently provide a second local supply voltage to the second functional unit, said second local voltage regulator to reduce the second local supply voltage based at least in part on a gap between instructions in the second stream of instructions; and
      a global power grid to power the first and second local voltage regulators with the global supply voltage.

9. The computer system of claim 8, wherein at least one of the first and second local supply voltages is adjustable by the processor.

10. The computer system of claim 9, wherein at least one of the first and second local voltage regulators includes a digitized resistor to be set by the processor.

11. The computer system of claim 8, wherein the processor is a graphics controller.

12. A method comprising:
   providing a global supply voltage to a first local voltage regulator and a second local voltage regulator in a processor;
   providing a first local supply voltage from the first local voltage regulator to a first functional unit to execute a first stream of instructions;
   reducing the first local supply voltage based at least in part on a gap between instructions in the first stream of instructions;
   providing a second local supply voltage from the second local voltage regulator to a second functional unit to execute a second stream of instructions; and
   reducing the second local supply voltage based at least in part on a gap between instructions in the second stream of instructions.

13. The method of claim 12, wherein providing the first local supply voltage comprises:
   adjusting the first local supply voltage by the processor.

14. The method of claim 12, wherein the first functional unit comprises a floating point unit of the processor, and wherein providing the first local supply voltage comprises powering the floating point unit.

* * * * *